United States Patent
Akkarakaran et al.

(10) Patent No.: US 11,442,135 B2
(45) Date of Patent: Sep. 13, 2022

(54) POSITIONING METHODS FOR WIRELESS NETWORKS THAT UTILIZE BEAMFORMED COMMUNICATION

(71) Applicant: QUALCOMM Incorporated, San Diego, CA (US)

(72) Inventors: Sony Akkarakaran, Poway, CA (US); Tao Luo, San Diego, CA (US); Ozge Koymen, Princeton, NJ (US); Wooseok Nam, San Diego, CA (US); Samel Celebi, West New York, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 16/426,952

(22) Filed: May 30, 2019

(65) Prior Publication Data

US 2019/0369201 A1    Dec. 5, 2019

Related U.S. Application Data

(60) Provisional application No. 62/679,006, filed on May 31, 2018.

(51) Int. Cl.
   *G01S 5/02*    (2010.01)
   *G01S 5/10*    (2006.01)

(52) U.S. Cl.
   CPC ............ *G01S 5/0221* (2013.01); *G01S 5/10* (2013.01)

(58) Field of Classification Search
   CPC ................................ G01S 5/10; G01S 5/0221
   See application file for complete search history.

(56) References Cited

U.S. PATENT DOCUMENTS 9,571,978 B1 *  2/2017  Ananth ............... G01S 5/14
9,836,049 B1    12/2017  Tu
(Continued)

FOREIGN PATENT DOCUMENTS

| CN | 1753550 A | 3/2006 |
| CN | 105207708 A | 12/2015 |

(Continued)

OTHER PUBLICATIONS

Grossman, User equipment localization in a mobile communication network, WO2018/069208 (Year: 2018).*
(Continued)

*Primary Examiner* — Keith Ferguson
(74) *Attorney, Agent, or Firm* — Qualcomm Incorporated

(57) ABSTRACT

Positioning methods suitable for use in a wireless network that utilizes beamformed communication are disclosed. In an aspect, a range and/or granularity for reporting a reference signal timing difference (RSTD) may be configurable according to one or more beam parameters (e.g., a repetition factor, a beam shape, a frequency band, a subcarrier spacing numerology, a cyclic prefix, etc.). In another aspect, a transmitting node may transmit one or more parameters associated with a beam used to transmit a positioning reference signal (e.g., an angle of departure, a zenith of departure, a beamwidth, etc.). According to another aspect, a cyclic prefix length for a positioning reference signal that a transmitting node transmits via one or more beams may be configured to increase a number of neighbor cells visible to a receiving node.

24 Claims, 14 Drawing Sheets

(56) References Cited

U.S. PATENT DOCUMENTS

| | | | |
|---|---|---|---|
| 2011/0092237 | A1 | 4/2011 | Kato et al. |
| 2015/0236778 | A1 | 8/2015 | Jalali |
| 2016/0142880 | A1* | 5/2016 | Talluri .................. H04W 4/06 455/456.1 |
| 2016/0295366 | A1 | 10/2016 | Priyanto et al. |
| 2017/0108579 | A1 | 4/2017 | Irvine et al. |
| 2017/0171857 | A1* | 6/2017 | Lee ....................... G01S 5/0273 |
| 2017/0214508 | A1 | 7/2017 | Lee et al. |
| 2017/0289953 | A1 | 10/2017 | Chae |
| 2017/0366244 | A1 | 12/2017 | Lee et al. |
| 2017/0374637 | A1 | 12/2017 | Akkarakaran et al. |
| 2018/0049149 | A1 | 2/2018 | Lee et al. |
| 2018/0054286 | A1* | 2/2018 | Tang .................... H04B 7/0456 |
| 2018/0098187 | A1 | 4/2018 | Blankenship et al. |
| 2019/0104549 | A1* | 4/2019 | Deng .................. H04W 52/365 |
| 2021/0112522 | A1 | 4/2021 | Kim et al. |

FOREIGN PATENT DOCUMENTS

| | | |
|---|---|---|
| CN | 107431678 A | 12/2017 |
| CN | 107734587 A | 2/2018 |
| CN | 108064056 A | 5/2018 |
| CN | 112075047 A | 12/2020 |
| EP | 2938117 A1 | 10/2015 |
| WO | 2012108912 A1 | 8/2012 |
| WO | 2013125993 A1 | 8/2013 |
| WO | 2016153253 A1 | 9/2016 |
| WO | 2016190806 A1 | 12/2016 |
| WO | 2017164925 A1 | 9/2017 |

OTHER PUBLICATIONS

CATT: "On Multiplexing of Signals and Physical Channels", 3GPP TSG RAN WG1 Meeting #92bis, 3GPP Draft; R1-1803741, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16-Apr. 20, 2018, Apr. 15, 2018 (Apr. 15, 2018), 7 Pages, XP051426036, Retrieved from the Internet: URL: http://www.3gpp.org/ftp/Meetings%5F3GPP%5FSYNC/RAN1/Docs/ [retrieved on Apr. 15, 2018] paragraph [02.3].

ERICSSON: "Remaining Issues on Beam Measurement and Reporting", 3GPP TSG-RAN WG1 Meeting #93, 3GPP Draft; R1-1806217 Remaining Issues for Beam Measurement and Reporting, 3rd Generation Partnership Project (3GPP), Mobile Competence Centre; 650, Route Des Lucioles; F-06921 Sophia-Antipolis Cedex, vol. RAN WG1, No. Busan, Korea; May 21-May 25, 2018, May 20, 2018 (May 20, 2018), pp. 1-13, XP051441426, Retrieved from the Internet: URL: http://www.3gpp.org/ftp/Meetings%5F3GPP%5FSYNC/RAN1/Docs/ [retrieved on May 20, 2018] paragraph [2.2.1 ].

Fujitsu: "On Remaining Details of Synchronization Signal", 3GPP TSG RAN WG1 Meeting #90bis, 3GPP Draft; R1-1717713 On Remaining Details of Synchronization Signal Final, 3rd Generation Partnership Project (3GPP), Mobile Competence Centre; 650, Route Des Lucioles; F-06921 Sophia-Antipolis Cedex, vol. RAN WG1, No. Prague, Czech Republic; Oct. 9-Oct. 13, 2017, Oct. 2, 2017 (Oct. 2, 2017), pp. 1-7, XP051352488, Retrieved from the Internet: URL: http://www.3gpp.org/ftp/tsg_ran/WG1_RL1/TSGR1_90b/Docs/[retrieved on Oct. 2, 2017].

International Search Report and Written Opinion—PCT/US2019/035026—ISA/EPO—dated Oct. 14, 2019.

SAMSUNG: "Remaining Issues on the NR Mobility", 3GPP TSG RAN WG1 #90b, 3GPP Draft; R1-1717583 Mobility V3, 3rd Generation Partnership Project (3GPP), Mobile Competence Centre; 650, Route Des Lucioles, F-06921 Sophia-Antipolis Cedex; France, vol. RAN WG1, No. Prague. Czech Republic; Oct. 9-Oct. 13, 2017, Oct. 2, 2017 (Oct, 2, 2017), 15 Pages, XP051352230, Retrieved from the Internet: URL: http://www.3gpp.org/ftp/tsg_ran/WG1_RL1/TSGR1_90b/Docs/ [retrieved on Oct. 2, 2017] paragraph [0003].

Partial International Search Report—PCT/US2019/035026—ISA/EPO—dated Aug. 8, 2019.

ZTE, et al., "On UE-Based OTDOA Positioning", 3GPP TSG-RAN WG2 Meeting #101, R2-1801967, Athens, Greece, Feb. 26-Mar. 2, 2018, 3 Pages.

Taiwan Search Report—TW108118924—TIPO—dated Jun. 7, 2022.

\* cited by examiner

POSITIONING METHODS FOR WIRELESS NETWORKS THAT UTILIZE BEAMFORMED COMMUNICATION

CROSS-REFERENCE TO RELATED APPLICATION

The present Application for Patent claims the benefit of U.S. Provisional Patent Application No. 62/679,006 entitled "ENHANCED POSITIONING METHODS FOR WIRELESS NETWORKS THAT UTILIZE BEAMFORMED COMMUNICATION," filed May 31, 2018, assigned to the assignee hereof, and expressly incorporated herein by reference in its entirety.

TECHNICAL FIELD

Various aspects described herein generally relate to wireless communication systems, and more particularly, to enhanced positioning methods that are suitable for use in wireless networks that utilize beamformed communication.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein generally refers to both MIMO and massive MIMO. MIMO is a method to multiply the capacity of a radio link by using multiple transmit and receive antennas to exploit multipath propagation, which occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than a single RF signal would be sent, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). However, the unique challenges of heavy path-loss faced by mmW communication systems necessitate new techniques such as hybrid beamforming that is joint digital and analog beamforming, which are not present in third generation (3G) and/or fourth generation (4G) wireless communication systems. Accordingly, there may be a need to enhance positioning methods that are traditionally used in wireless networks to take into account the unique challenges that may arise with beamformed communication.

For example, where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, disclosed herein are techniques for enhanced positioning methods that are suitable for use in a wireless network that utilizes beamformed communication. More particularly, in one aspect, a range and/or granularity for measuring and/or reporting a reference signal timing difference (RSTD) may be configurable according to one or more beam parameters (e.g., a repetition factor, a beam shape, a frequency band, a subcarrier spacing numerology, a cyclic prefix, etc.). In another aspect, a transmitting node may transmit one or more parameters associated with a beam used to transmit a positioning reference signal (e.g., an angle of departure, a zenith of departure, a beamwidth, etc.). According to another aspect, a cyclic prefix length for a positioning reference signal that a transmitting node transmits via one or more beams may be configured to increase a number of neighbor cells visible to a receiving node. In another aspect, in response to detecting a change in a position (e.g., a change in latitude-longitude or a change in orientation), a mobile base station may determine a current position associated therewith and signal the current position via the wireless network. In a further aspect, a base station may configure one or more positioning schemes according to operating conditions received from a UE. In still another aspect, a Remote Radio Head (RRH)/Distributed Antenna System (DAS) may transmit a positioning reference signal in the same beam as a synchronization signal block, which may comprise frequency division multiplexing the positioning reference signal with the synchronization signal block in a digital domain.

According to various aspects, a method for positioning in beamformed communications may comprise receiving multiple beams that each include a positioning reference signal, determining one or more parameters associated with each of the multiple beams, and configuring one or more of a range or a granularity for measuring and/or reporting a reference signal timing difference (RSTD) according to the one or more parameters.

According to various aspects, an apparatus may comprise a receiver configured to receive multiple beams, wherein the multiple beams each include a positioning reference signal and at least one processor configured to determine one or more parameters associated with each of the multiple beams and to configure one or more of a range or a granularity for measuring and/or reporting a RSTD according to the one or more parameters.

According to various aspects, an apparatus may comprise means for receiving multiple beams, wherein the multiple beams each include a positioning reference signal, means for determining one or more parameters associated with each of the multiple beams, and means for configuring one or more of a range or a granularity for measuring and/or reporting a RSTD according to the one or more parameters.

According to various aspects, a computer-readable medium may have computer-executable instructions for a processor of an apparatus stored thereon, wherein the computer-executable instructions may comprise one or more instructions of a processor of an apparatus stored thereon. The instructions may comprise one or more instructions causing the processor to receive multiple beams that each include a positioning reference signal, one or more instructions causing the processor to determine one or more parameters associated with each of the multiple beams, and one or more instructions causing the processor to configure one or more of a range or a granularity for measuring and/or reporting a RSTD according to the one or more parameters.

According to various aspects, a method for positioning in beamformed communications may comprise determining, at a transmitting node, one or more parameters associated with a beam used to transmit a positioning reference signal, transmitting, by the transmitting node, the one or more parameters associated with the beam over a wireless network, and transmitting the positioning reference signal via the beam according to the one or more transmitted parameters associated with the beam.

According to various aspects, an apparatus may comprise at least one processor configured to determine one or more parameters associated with a beam used to transmit a positioning reference signal, the one or more parameters including an angle of departure, a zenith of departure, a beamwidth, or any combination thereof and a transmitter configured to transmit the one or more parameters associated with the beam to one or more of a network entity or a user equipment and transmit the positioning reference signal via the beam according to the one or more transmitted parameters associated with the beam.

According to various aspects, an apparatus may comprise means for determining one or more parameters associated with a beam used to transmit a positioning reference signal, the one or more parameters including an angle of departure, a zenith of departure, a beamwidth, or any combination thereof, means for transmitting the one or more parameters associated with the beam over a wireless network, and means for transmitting the positioning reference signal via the beam according to the one or more transmitted parameters associated with the beam.

According to various aspects, a computer-readable medium may have computer-executable instructions for a processor of an apparatus stored thereon. The computer-executable instructions may comprise one or more instructions causing the processor to determine one or more parameters associated with a beam used to transmit a positioning reference signal, one or more instructions causing the processor to transmit the one or more parameters associated with the beam over a wireless network, and one or more instructions causing the processor to transmit the positioning reference signal via the beam according to the one or more transmitted parameters associated with the beam.

According to various aspects, a method for positioning in beamformed communications may comprise configuring a cyclic prefix length for a positioning reference signal to increase a number of neighbor cells visible to a receiving node and causing one or more transmitting nodes to transmit the positioning reference signals via one or more beams according to the configured cyclic prefix length.

According to various aspects, an apparatus may comprise a memory and at least one processor coupled to the memory, the memory and the at least one processor configured to choose a cyclic prefix length for a positioning reference signal to increase a number of neighbor cells visible to a receiving node and to cause one or more transmitting nodes to transmit the positioning reference signals via one or more beams according to the configured cyclic prefix length.

According to various aspects, an apparatus may comprise means for configuring a cyclic prefix length for a positioning reference signal to increase a number of neighbor cells visible to a receiving node and means for causing one or more transmitting nodes to transmit the positioning reference signals via one or more beams according to the configured cyclic prefix length.

According to various aspects, a computer-readable medium may have computer-executable instructions for a processor of an apparatus stored thereon. The computer-executable instructions comprise one or more instructions causing the processor to configure a cyclic prefix length for a positioning reference signal to increase a number of neighbor cells visible to a receiving node and one or more instructions causing the processor to cause one or more transmitting nodes to transmit the positioning reference signals via one or more beams according to the configured cyclic prefix length.

According to various aspects, a method for positioning in beamformed communications may comprise detecting, at a mobile base station, a change in a position of the mobile base station, determining, at the mobile base station, a current position of the mobile base station in response to detecting the change in the position of the mobile base station, and signaling, via a wireless network, the current position of the mobile base station.

According to various aspects, a mobile base station may comprise at least one processor configured to determine a current position of the mobile base station in response to a change in a position of the mobile base station, and a transmitter configured to signal, via a wireless network, the current position of the mobile base station.

According to various aspects, a mobile base station may comprise means for detecting a change in a position of the mobile base station, means for determining a current position of the mobile base station in response to detecting the change in the position of the mobile base station, and means for signaling, via a wireless network, the current position of the mobile base station.

According to various aspects, a computer-readable medium may have computer-executable instructions for a processor of an apparatus stored thereon. The computer-executable instructions may comprise one or more instructions causing the processor to detect a change in a position of the apparatus, one or more instructions causing the processor to determine a current position of the apparatus in response to detecting the change in the position of the apparatus, and signal, via a wireless network, the current position of the apparatus.

According to various aspects, a method for positioning in beamformed communications may comprise transmitting, by a base station to a UE, a request to report operating conditions at the UE, receiving the requested operating conditions from the UE, and configuring the one or more positioning schemes according to the operating conditions received from the UE.

According to various aspects, an apparatus may comprise a transmitter configured to transmit, to a UE, a request to report operating conditions at the UE, a receiver configured to receive the requested operating conditions from the UE, and at least one processor configured to configure the one or more positioning schemes according to the operating conditions received from the UE.

According to various aspects, an apparatus may comprise means for transmitting, to a UE, a request to report operating conditions at the UE, means for receiving the requested operating conditions from the UE, and means for configuring the one or more positioning schemes according to the operating conditions received from the UE.

According to various aspects, a computer-readable medium may have computer-executable instructions for a processor of an apparatus stored thereon. The computer-executable instructions may comprise one or more instructions causing the processor to transmit, to a UE, a request to report operating conditions at the UE, one or more instructions causing the processor to receive the requested operating conditions from the UE, and one or more instructions causing the processor to configure the one or more positioning schemes according to the operating conditions received from the UE.

According to various aspects, a method for positioning in beamformed communications may comprise configuring, at a Remote Radio Head (RRH)/Distributed Antenna System (DAS), a positioning reference signal to be transmitted in the same beam as a synchronization signal block such that the positioning reference signal and the synchronization signal block have substantially the same spatial characteristics and transmitting, by the RRH/DAS, the positioning reference signal in the same beam as the synchronization signal block.

According to various aspects, an apparatus may comprise at least one processor configured to configure a positioning reference signal to be transmitted in the same beam as a synchronization signal block such that the positioning reference signal and the synchronization signal block have substantially the same spatial characteristics and a transmitter configured to transmit the positioning reference signal in the same beam as the synchronization signal block.

According to various aspects, an apparatus may comprise means for configuring a positioning reference signal to be transmitted in the same beam as a synchronization signal block such that the positioning reference signal and the synchronization signal block have substantially the same spatial characteristics and means for transmitting the positioning reference signal in the same beam as the synchronization signal block.

According to various aspects, a computer-readable medium may have computer-executable instructions for a processor of an RRH/DAS stored thereon. The computer-executable instructions may comprise one or more instructions causing the processor to configure a positioning reference signal to be transmitted in the same beam as a synchronization signal block such that the positioning reference signal and the synchronization signal block have substantially the same spatial characteristics and one or more instructions causing the processor to transmit the positioning reference signal in the same beam as the synchronization signal block.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
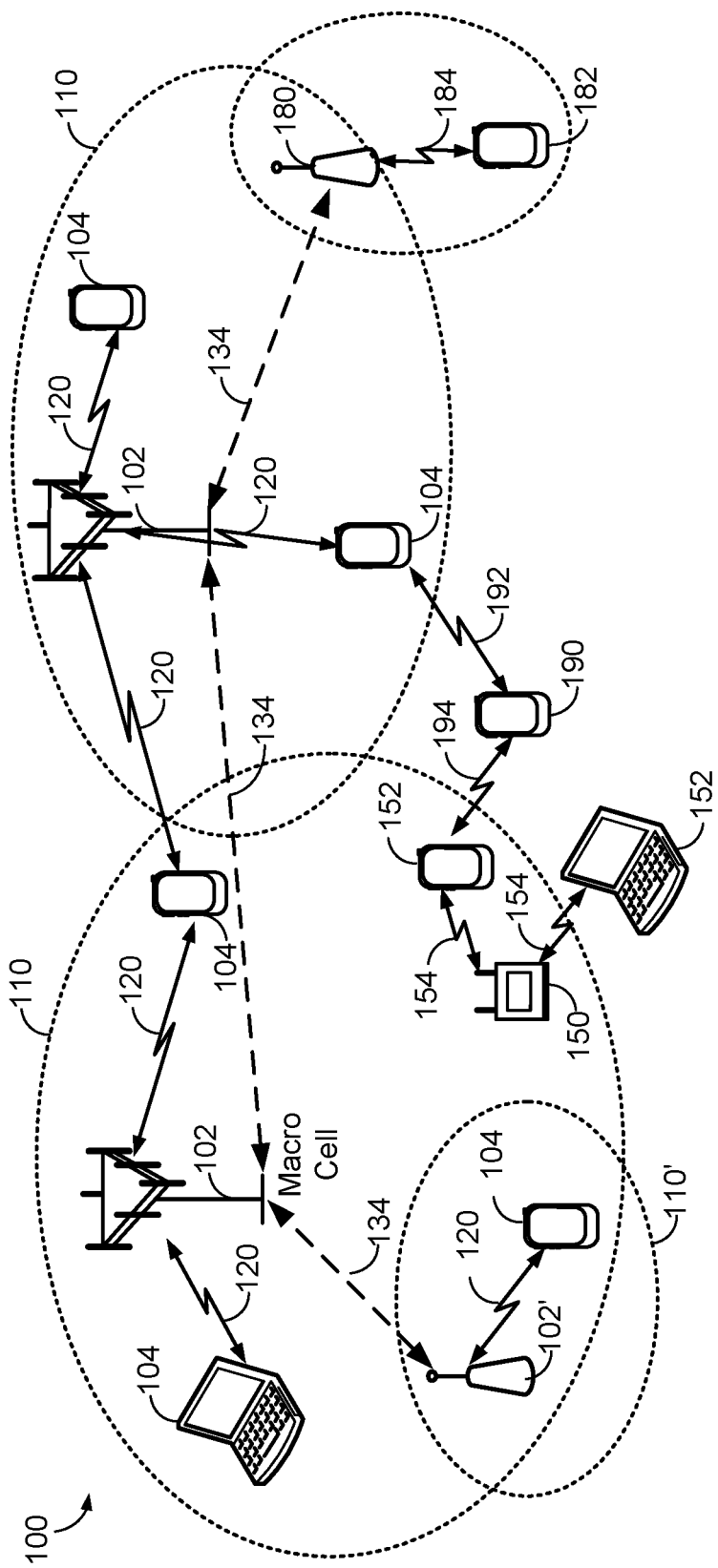
FIG. 1 illustrates an exemplary wireless communications system, according to various aspects of the disclosure.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any aspect or embodiment described herein as "exemplary" is not necessarily to be construed as preferred or advantageous over other aspects or embodiments. Likewise, the terms "aspects" and "embodiments" do not require that all aspects or embodiments include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, smart watches and other wearable devices, servers, routers, electronic devices implemented in vehicles (e.g., automobiles, bicycles, motorcycles, etc.) and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an LTE network, gNodeBs (gNBs) where the wireless communications system 100 corresponds to a 5G network, and/or a combination thereof, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
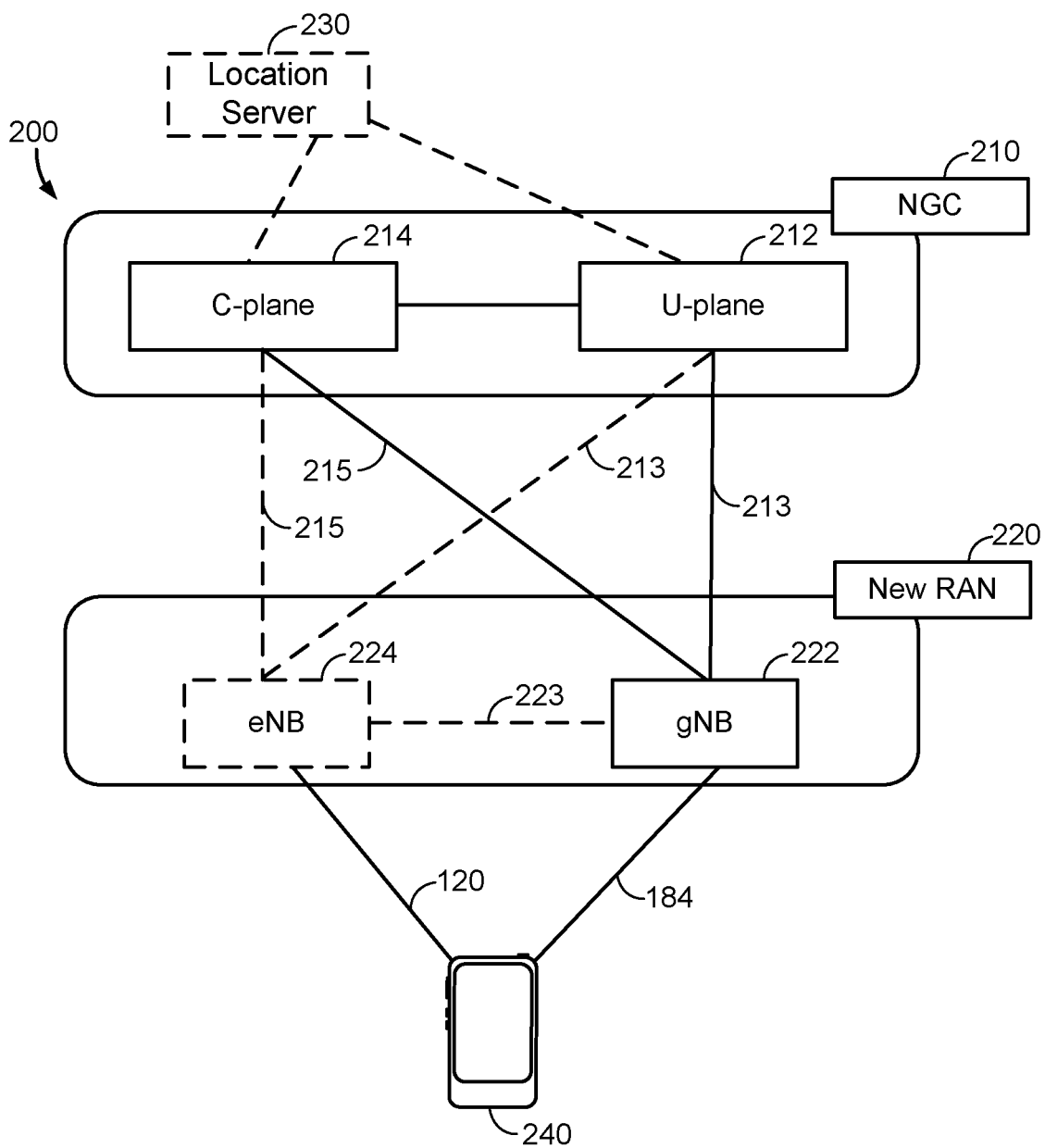
FIGS. 2A and 2B illustrate example wireless network structures, according to various aspects of the disclosure.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
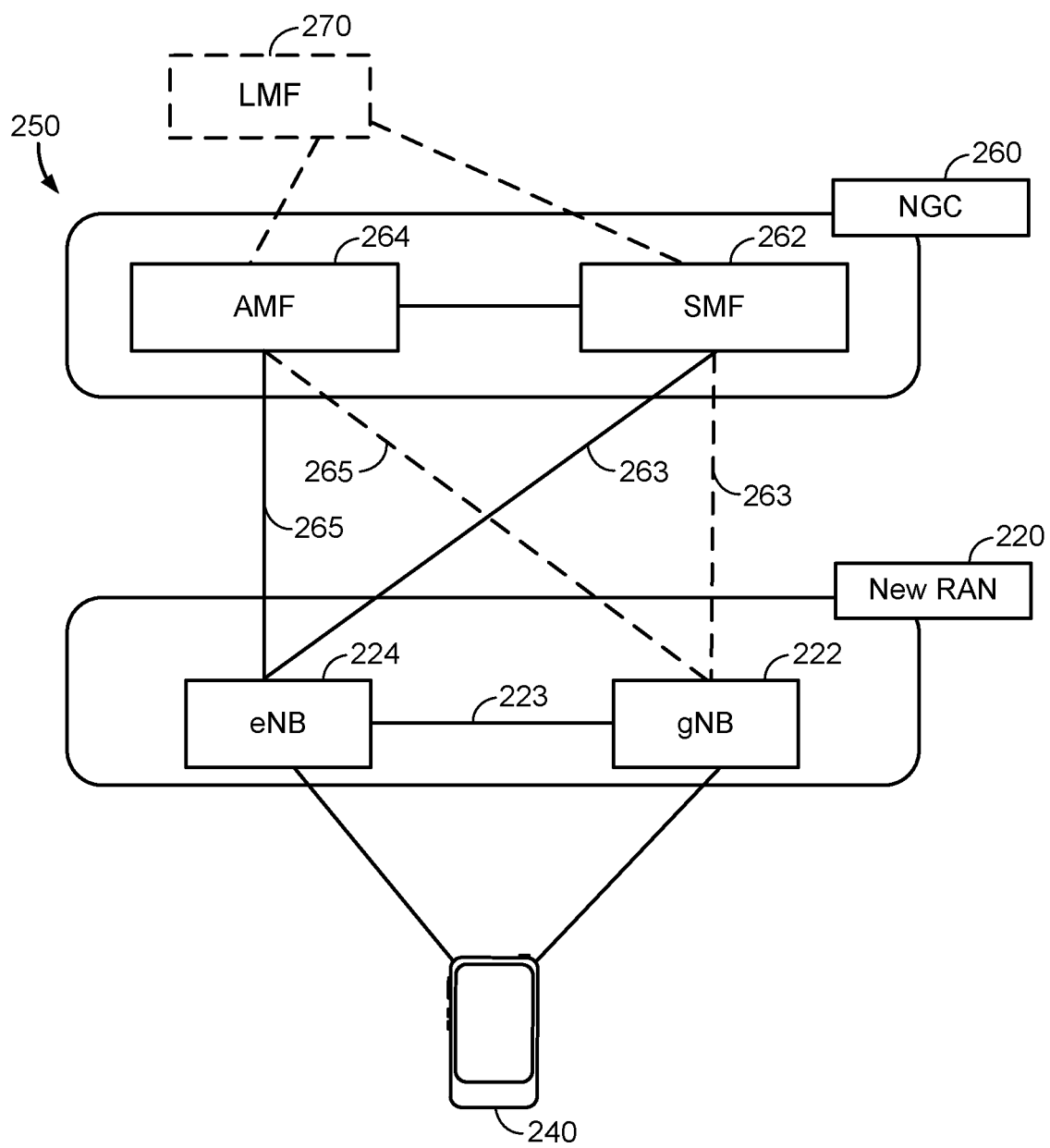

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
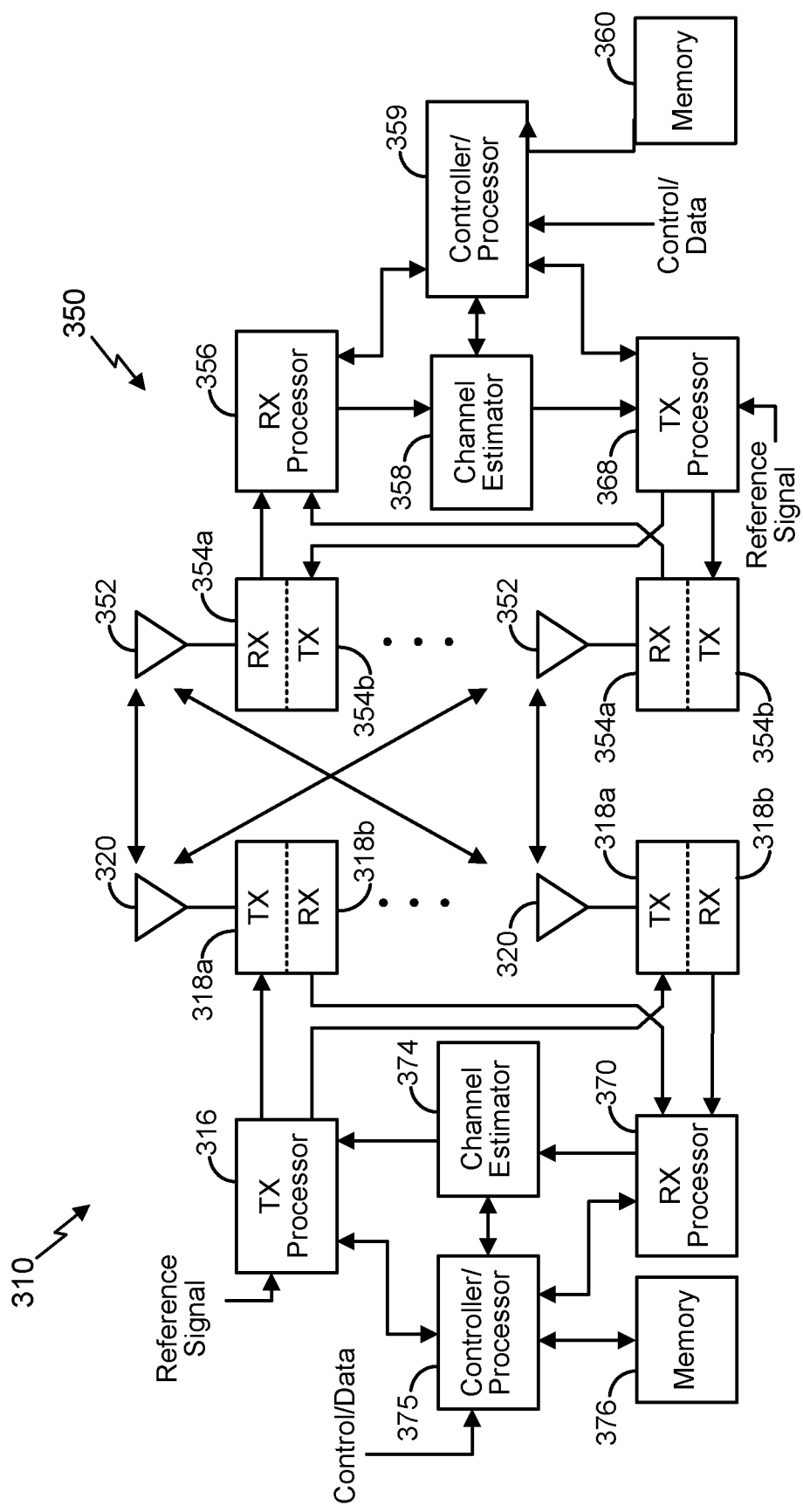
FIG. 3 illustrates an exemplary base station and an exemplary UE in an access network, according to various aspects of the disclosure.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
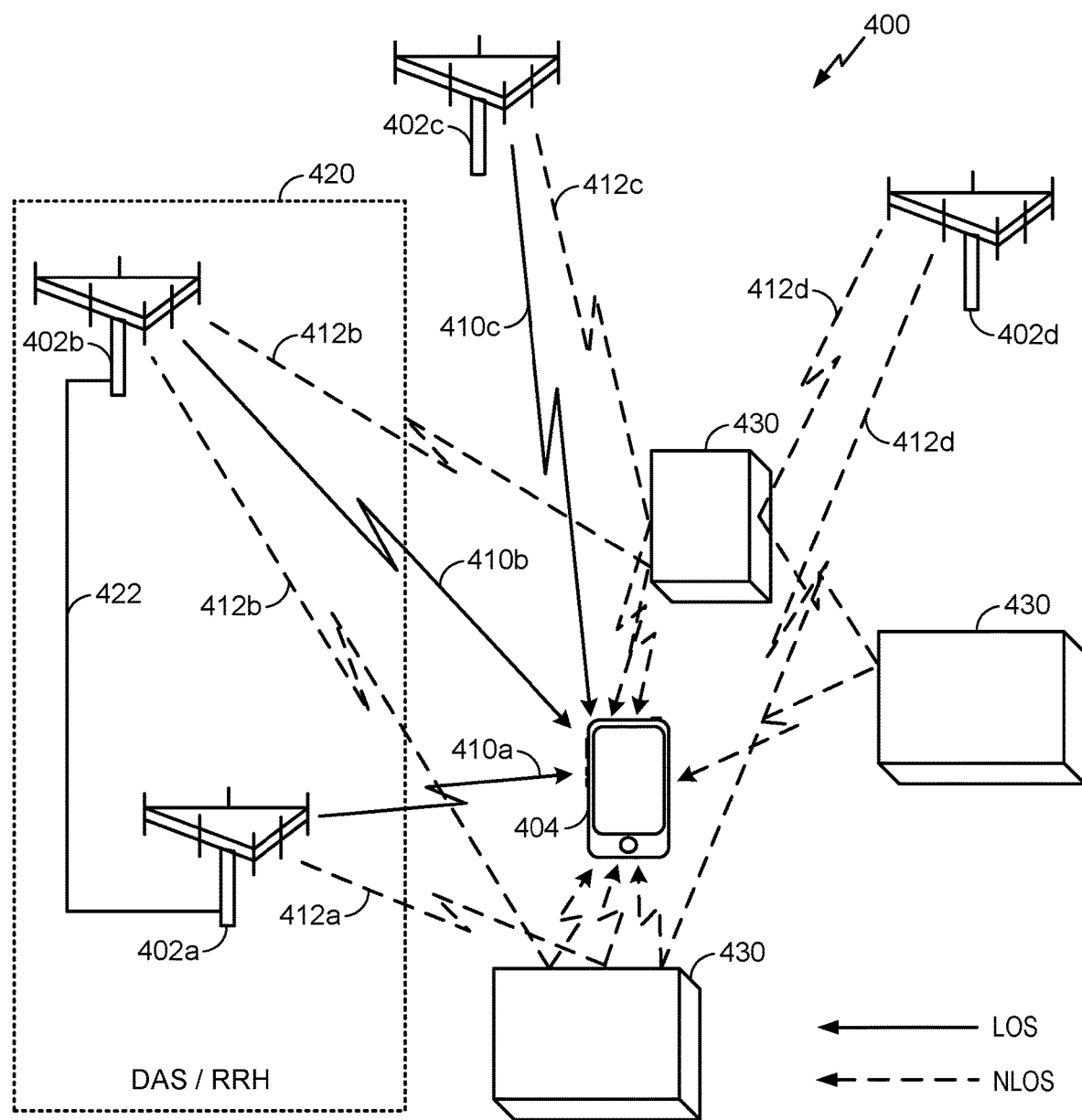
FIG. 4 illustrates an exemplary wireless communications system, according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signal blocks (SSB), Timing Reference Signals (TRS), etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Location Management Function (LMF) is an example of the location server in 5G, and Enhanced Serving Mobile Location Center (e-SMLC) in LTE. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Reference Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 5, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
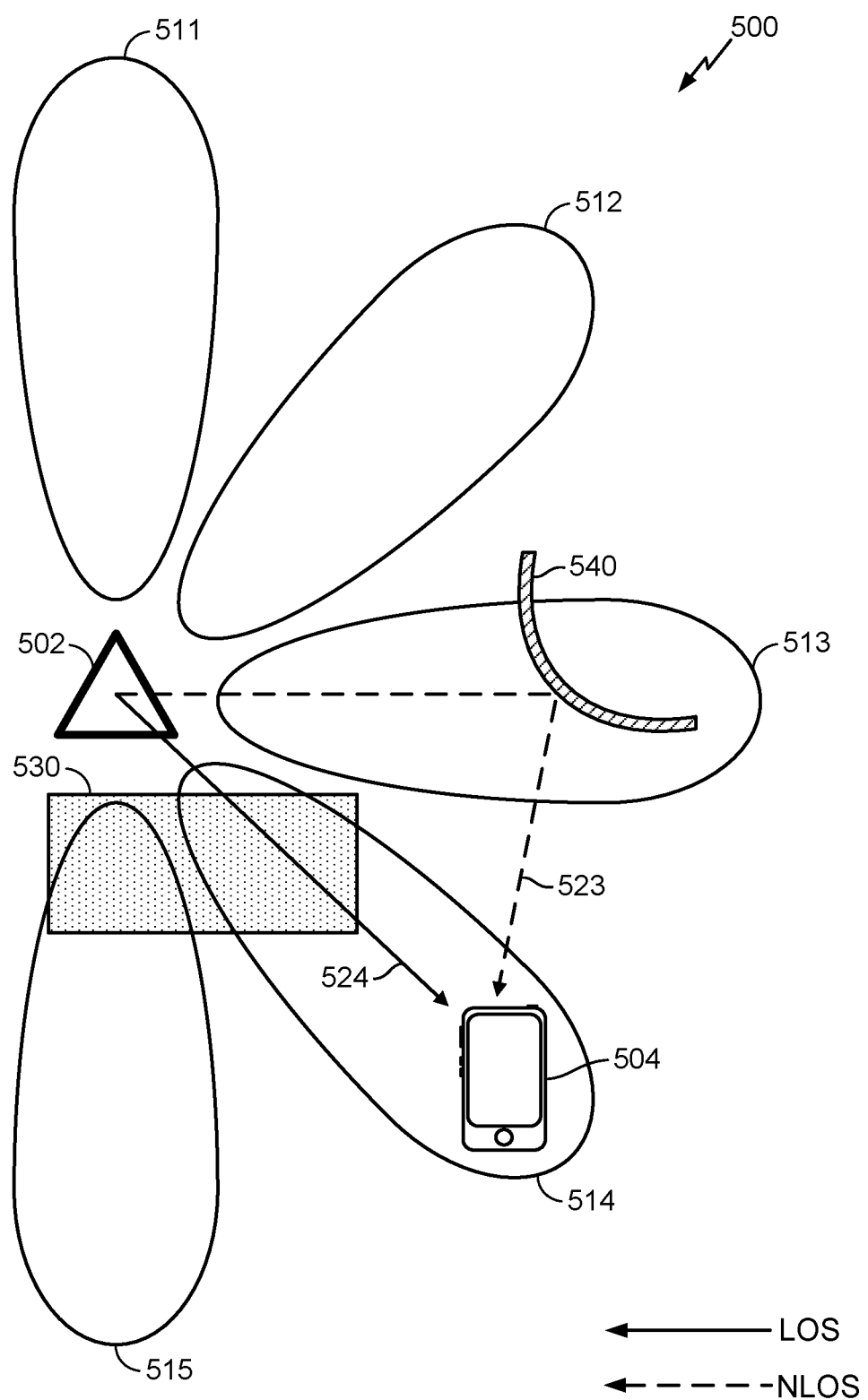
FIG. 5 illustrates an exemplary wireless communications system, according to various aspects of the disclosure.

FIG. 5 illustrates an exemplary wireless communications system 500 according to various aspects of the disclosure. In the example of FIG. 5, a UE 504, which may correspond to UE 404 in FIG. 4, is attempting to calculate an estimate of its position, or to assist another entity (e.g., a base station or core network component, another UE, a location server, a third party application, etc.) to calculate an estimate of its position. The UE 504 may communicate wirelessly with a base station 502, which may correspond to one of base stations 402 in FIG. 4, using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 receives an NLOS data stream 523 of RF signals transmitted on beam 513 and an LOS data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS data stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS data stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS data stream 524 is weaker than the NLOS data stream 523, the LOS data stream 524 will arrive at the UE 504 before the NLOS data stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS data stream 523. The beam of interest for position estimation, however, would be the beam 514, as it carries the strongest LOS data stream 524, despite being obstructed.

Figure 6A:
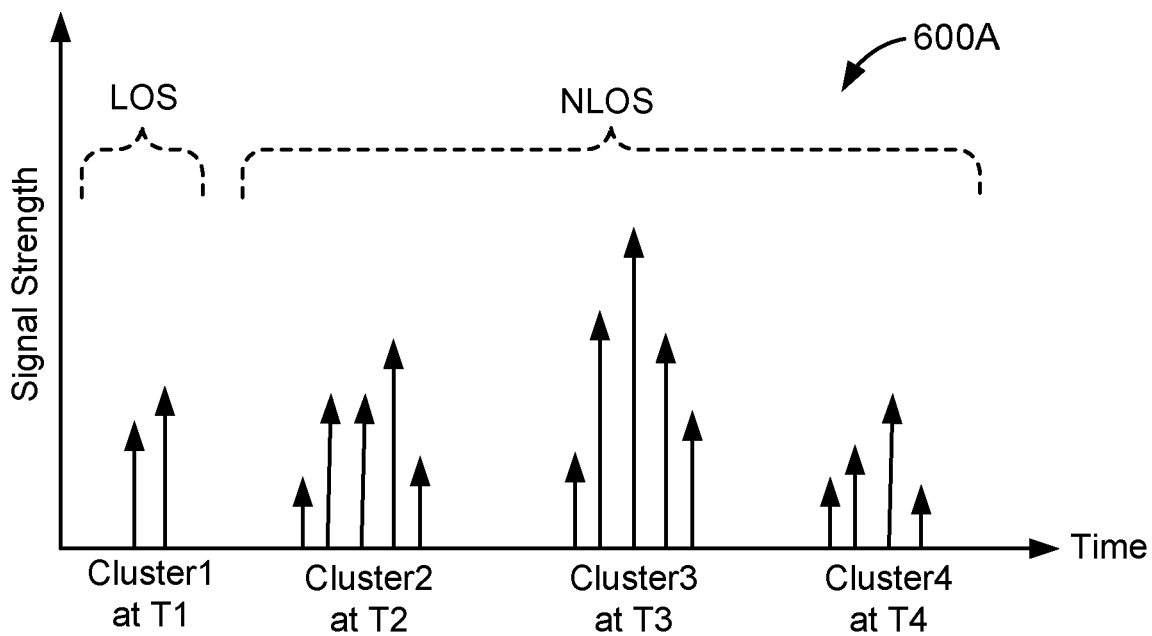
FIG. 6A is a graph showing the RF channel response at a UE over time, according to various aspects of the disclosure.
Figure 6B:
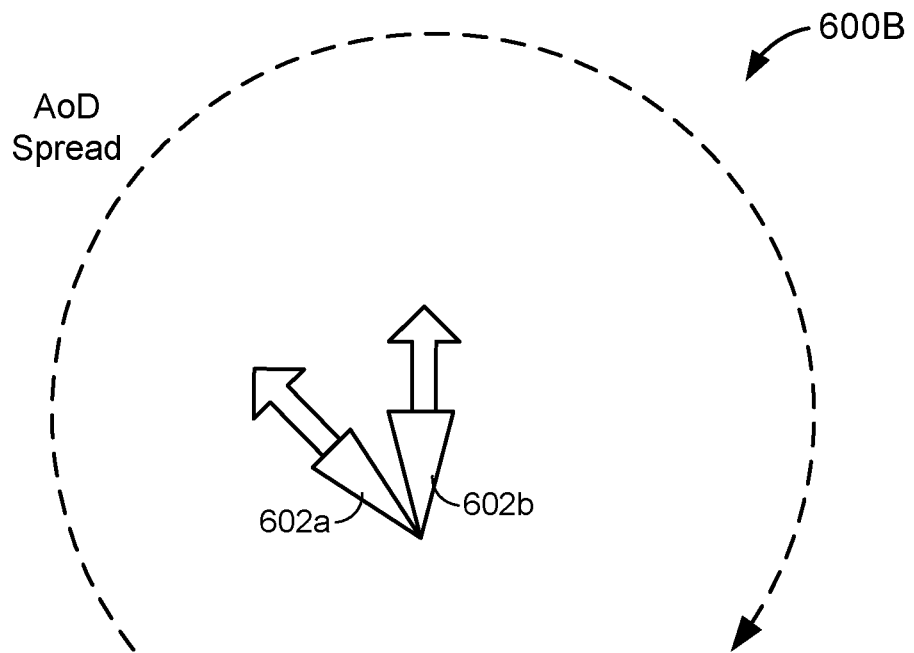
FIG. 6B illustrates an exemplary separation of clusters in Angle of Departure (AoD), according to various aspects of the disclosure.

FIG. 6A is a graph 600A showing the RF channel response at a receiver (e.g., UE 504) over time according to various aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS data stream (i.e., the data stream arriving over the LOS or the shortest path), and may correspond to the LOS data stream 524. The third cluster at time T3 is comprised of the strongest RF signals, and may correspond to the NLOS data stream 523. Seen from the transmitter's side, each cluster of received RF signals may comprise the portion of an RF signal transmitted at a different angle, and thus each cluster may be said to have a different angle of departure (AoD) from the transmitter. FIG. 6B is a diagram 600B illustrating this separation of clusters in AoD. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also partially overlap even though the clusters are separated in time. For example, this may arise when two separate buildings at same AoD from the transmitter reflect the signal towards the receiver. Note that although FIG. 6A illustrates clusters of two to five channel taps, as will be appreciated, the clusters may have more or fewer than the illustrated number of channel taps.

As in the example of FIG. 5, the base station may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omni-directional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with transmit beamforming in certain embodiments.

According to various aspects, as will be apparent from the foregoing description, beamformed communication (including transmit beamforming, receive beamforming, and/or combinations thereof) are expected to become more and more widespread in many wireless network deployments, including but not limited to wireless networks that operate in sub-6 GHz bands and mmW bands. In the foregoing description, certain techniques are described to identify and report one or more beam(s) of interest that are suitable for position estimation such that a node may receive a sufficient number of shortest path beams that can be accurately measured to calculate, or assist the calculation of, a position estimate associated with the node. In various use cases, this may involve measuring and reporting an OTDOA from individual network nodes and/or RSTDs between reference RF signals received from pairs of network nodes (e.g., different base stations or different antennas or transmission points belonging to the same base station). As such, due to the unique challenges of heavy path-loss faced in mmW communication systems and other wireless networks that utilize beamformed communication, the following description provides various enhanced methods to support positioning in wireless networks that utilize beamformed communications.

More particularly, as noted above, OTDOA-based positioning methods are generally based on the Reference Signal Time Difference (RSTD) measurement, which is defined as the relative time difference between two different network nodes as measured at a UE. In general, because the RSTD measurement is defined as the time difference between two network nodes, the RSTD measurement may take into account a transmit time offset between the two network nodes, referred to as a Real Time Difference (RTD), which refers to the relative synchronization difference between the two network nodes. For example, if a first network node transmits a signal at a time $t_0$ and a second network node transmits the signal at a time $t_1$, then the RTD between the first network node and the second network node is $t_1 - t_0$. If the two network nodes transmit at exactly the same time, the network is perfectly synchronized and the RTD therefore equals zero in such a case. Furthermore, in a wireless network that utilizes beamformed communication, the reference signals that two network nodes transmit may follow different paths and be subject to different propagation times. As such, in various embodiments, the RTD in a wireless network that utilizes beamformed communications may further take into account a propagation time difference, whereby the RTD may equal a "real" difference between the times at which two network nodes transmit the signal plus a propagation time difference between the two signals.

Furthermore, according to various aspects, the RSTD measurement in a wireless network that utilizes beamformed communications may be performed on a per-beam basis to account for different possible beam-specific parameters. For example, as discussed in further detail above, different beams can be transmitted from different panels that are spatially separated to improve positioning accuracy. In other examples, some beams may have a narrow beamwidth while other beams may have a wide beamwidth. In general, narrow beams may be more focused and therefore have a high beamforming gain. On the other hand, relatively wider beams may cover a wider angular area at the cost of a reduction in the beamforming gain. As such, wider beams may have a larger repetition factor to increase the likelihood that receiving devices will be able to hear and decode the signals carried therein. According to various aspects, because different beams may have different parameters which may include different repetition factors, a receiving device (e.g., a UE) performing a per-beam RSTD measurement may therefore compute an average per-beam RSTD across multiple observations of the signal carried therein. In various embodiments, the receiving device may also determine whether one or more parameters associated with the beam(s) are reconfigured (e.g., a beam shape parameter such as a quasi-colocation (QCL) relation of the beam). If one or more parameters associated with the beam(s) have been reconfigured, the receiving device may reset the averaging of the RSTD measurement to ensure that the reported values are not based on an old or otherwise obsolete configuration.

According to various aspects, another possible enhancement to positioning methods used in wireless networks that employ beamformed communications may be to configure an RSTD range and granularity according to the particular communication parameters used in the network. More particularly, in various wireless networks such as those described in further detail above, physical layers may be highly configurable and the subcarrier spacing (e.g., Orthogonal Frequency-Division Multiplexing (OFDM) waveform) associated with the reference signals used for positioning may vary. For example, in the wireless network structures 200, 250 shown in FIG. 2A-2B, the subcarrier spacing of the reference signals used for positioning can vary from 15 KHz to 240 KHz and the reference signals can be transmitted over various bandwidths (e.g., from a few hundred KHz to a hundred MHz to multiple hundred MHz positioning beacons stitched together). The accuracy of the RSTD measurement used to estimate position may therefore depend on these and/or other signal parameters. Accordingly, the range and granularity (e.g., timing resolution or step size) of RSTD measurements may depend on certain network configuration(s) or signal parameters.

For example, as way of background, the reporting range of RSTD measurements in LTE networks is defined from [−NxTs to NxTs] in steps of size kxTs, where N is a constant having a value equal to 15391, k is a constant that equals one (1) if the absolute value of the RSTD measurement is less than or equal to 4096 Ts or five (5) if the absolute value of the RSTD measurement is greater than 4096 Ts, and Ts is a basic time unit defined as Ts=1/(15000×2048) seconds, which approximates to 32 nanoseconds, which in turn corresponds to about 9.8 meters. In 5G, for example in mmW and other networks that utilize beamformed communications, N and k may instead be defined as a function of the particular configuration used in the network. For example, mmW networks may use smaller cells, resulting in smaller propagation distances and thus a smaller range 'N' may be sufficient, which could allow a smaller granularity 'k' for the same amount of RSTD reporting overhead. Alternatively, the PRS signals may be designed with sufficient repetition factor so that even in such smaller cells, the PRS can be heard over larger distances, in which case a comparatively larger range 'N' may be required. As such, N, k may be configurable, and may be chosen based on other parameters such as PRS repetition factor. In another example, N and k may be a function of a band used for communication (e.g., sub-6 GHz, mmW, etc.), numerology, cyclic prefix (CP), etc. In particular, as will be apparent to those skilled in the art, numerology may generally refer to a subcarrier spacing, which may be configurable from 15 KHz to 240 KHz (e.g., $2^N \times 15$ KHz) and therefore potentially different in different cells. For example, if the subcarrier spacing is doubled, then OFDM symbol durations may be halved, whereby shorter symbol durations may result in a finer granularity. In various embodiments, because the numerology can vary in different cells, a device performing the RSTD measurement may be configured to choose the numerology used to determine the RSTD range and granularity parameters N, k, Ts in various ways where different cells use a different numerology (e.g., the maximum subcarrier spacing, the minimum subcarrier spacing, a preconfigured subcarrier spacing, the subcarrier spacing used in a serving cell, etc.).

Figure 7:
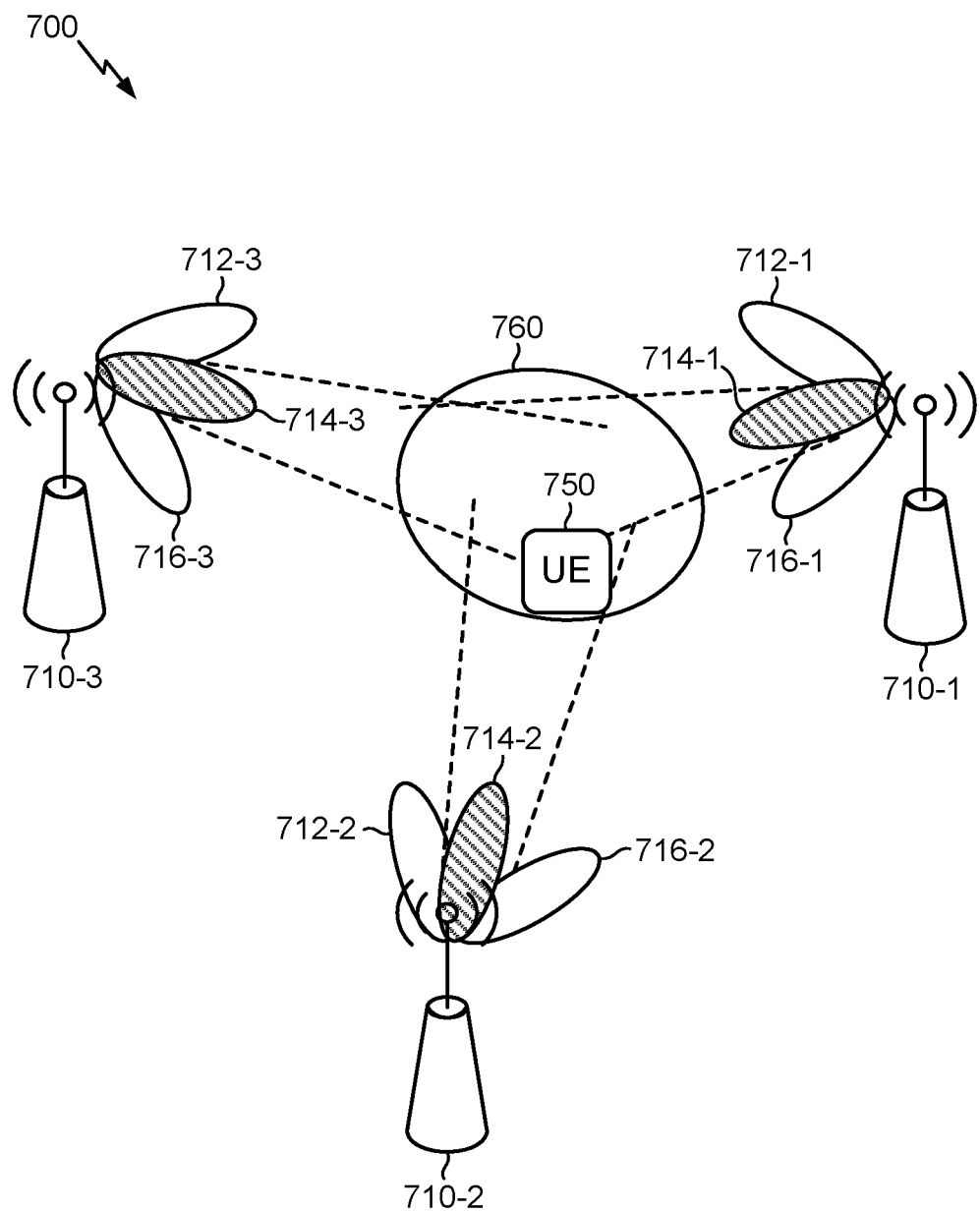
FIG. 7 illustrates an exemplary wireless communication system that may implement various enhanced positioning methods to support beamformed communication, according to various aspects.

According to various aspects, FIG. 7 illustrates an exemplary wireless communication system 700 that may implement various enhanced positioning methods to support beamformed communication. More particularly, in FIG. 7, three network nodes 710-1, 710-2, 710-3 are each transmitting reference signals (e.g., Positioning Reference Signals (PRS), Cell-specific Reference Signals (CRS), Channel State Information Reference Signals (CSI-RS), synchronization signal blocks (SSB), Timing Reference Signals (TRS), etc.) to aid in determining a position of a UE 750 via several separate beams to cover a certain geographic area (e.g., three separate beams 712, 714, 716 in the illustrated example, although those skilled in the art will appreciate that each network node 710 may transmit more or fewer beams in practice). In particular, rather than transmitting the reference signals omnidirectionally in a manner that may result in severe propagation loss, the reference signals are transmitted via narrower beams according to a sweeping pattern to improve beamforming gain in each direction.

In FIG. 7, from the perspective of the UE 750, beam 714-1 is the strongest beam among the beams 712-1, 714-1, 716-1 from network node 710-1 as seen at the UE 750, beam 714-2 is the strongest beam among the beams 712-2, 714-2, 716-2 from network node 710-2 as seen at the UE 750, and beam 714-3 is the strongest beam among the beams 712-3, 714-3, 716-3 from network node 710-3 as seen at the UE 750. As such, knowing various parameters associated with the strongest beams 714-1, 714-2, 714-3 as seen at the UE 750 may yield sufficient information to compute a rough position estimate 760 of the UE 750, depicted in FIG. 7 as a circle around the UE 750. In various embodiments, the network nodes 710-1, 710-2, 710-3 may therefore advertise or otherwise transmit parameters associated with the beams 712-716 transmitted thereby. For example, in various embodiments, these parameters may include an angle of departure (AoD), a zenith of departure (ZoD), a beamwidth, and/or other suitable beam parameters, which alone may provide the UE 750 with the relevant parameters to compute the rough position estimate 760 with or without regard to times of arrival (note that the accuracy of the position estimate 760 may increase as the number of network nodes 710 from which the UE 750 receives reference signals increases). Alternatively, if the rough position estimate 760 is being computed by the network, the UE 750 may simply report the strongest beam 714 from each network node 710 (e.g., as a beam index) and the network may compute the rough position estimate 760 based on the transmitted beam parameters. In this sense, the beam parameters such as AoD, ZoD, beamwidth, etc. may therefore be thought of as further information about the position of the network nodes 710 in addition to latitude-longitude or the like. Furthermore, as described above, beams from the same cell may be transmitted from different spatially separated locations (e.g., in a Remote Radio Head (RRH) or Distributed Antenna System (DAS) scenario). In various embodiments, transmitting the beam parameters may be optional, and in fact may not be possible in certain scenarios. For example, where one or more of the network nodes 710 are mobile (e.g., a small cell or home base station that may be moved around), the beam parameters may not accurately reflect the location of the transmitting node 710.

In various embodiments, the network nodes 710 may transmit the above-noted beam parameters to the UE 750 via one or more System Information Blocks (SIBs) and to network entities (e.g., an Enhanced Serving Mobile Location Center (e-SMLC) using upper layer interfaces. With dedicated/unicast or multicast reference signals, the parameters may be part of the reference signal configuration. For example, a table of possible parameter values may be configured in Radio Resource Control (RRC) signaling (e.g., by SIBs or unicast), and RRC/MAC-CE/DCI may indicate an index into this table. In various embodiments, the table may be semi-static and indicate a physical antenna configuration and the supported antenna codebook(s) of the network node 710.

According to various aspects, another enhanced positioning method may account for large cyclic prefix (CP) so as to handle larger propagation delays, where the CP is added to the beginning of each OFDM symbol to allow frequency domain equalization. As such, the CP length generally has to be at least as long as the delay spread (i.e., the maximum delay different between the first path and the last path) to avoid interference from one OFDM symbol to the next. Accordingly, as numerology scales up and subcarrier spacing increases, the OFDM symbol duration shrinks, but the propagation channel may not change correspondingly (e.g., the delay spread may not shrink proportionally). In various use cases where beamforming is utilized (e.g., mmW systems, small cells, etc.), narrow beams are steered in certain directions so the beams may not be seen at all at certain receiving devices. Furthermore, transmitting narrow beams may reduce multipath propagation. Accordingly, due to the use of beamforming, smaller symbol durations and consequently lower cyclic prefixes can be used. While this may be feasible for data communications, in the case of reference signals used for positioning, there may be a desire to design the reference signals for deep coverage (e.g., by repetition) to increase the number of neighbor cells that are seen and thereby improve positioning accuracy. Thus, the relatively lower CP that was sufficient for data communications may be insufficient for reference signals used for positioning purposes.

Accordingly, one option may be to repeat OFDM symbols, whereby the OFDM symbol used in a first reference signal may become the cyclic prefix of the next one or more reference signals. Alternatively or additionally, a separate waveform or cyclic prefix may be employed for positioning reference signals. For example, the positioning reference signals may have a numerology that is different from an OFDM numerology, in which case a guard band may be used to avoid interference with adjacent resource blocks (RBs). For a unicast (e.g., UE-specific) positioning reference signal, the network may also adjust an RTD so that the UE can still receive positioning reference signals from distant cells within the cyclic prefix, wherein this adjustment may generally depend on a rough estimate of the distance between the transmitting cell and the UE (i.e., requires a rough estimate of the position of the UE). For example, in adjusting the RTD, the network may delay the transmission from one network node with respect to another so that the applicable reference signals reach the UE at about the same time.

Furthermore, the above concept may extend to uplink time difference of arrival (UT-DOA), which is a UE-transparent positioning scheme in which the network measures a time-delay of arrival of UE uplink transmissions that are received at various base stations. This may be feasible in some networks such as 3G and 4G networks because the UE transmit antenna pattern may be omnidirectional, especially for the reference signals from which the uplink timing is measured. These reference signal transmissions from the UE may be received at multiple non-co-located base stations. However, in beamformed communication systems, such as mmW communication systems, due to use of uplink beamforming, the reference signal transmissions may be heard reliably by one base station (e.g., the base station in the direction of the beamformed signal). For example, to ensure coverage, sounding reference signal (SRS) repetition factors above 3GPP Rel-15 specifications may be enabled, or a Contention-Free Physical Random Access Channel (PRACH) may be used instead for greater range. In the latter case, different sequence lengths and/or repetition factors may be used to target different network nodes (e.g., different gNBs).

According to various aspects, another enhanced positioning method suitable for use in beamformed communication systems may be applicable to mobile base stations that may occasionally be moved from one location to another (e.g., small cell or home gNBs). In particular, there may be a need to automatically reconfigure a latitude and longitude associated with the mobile base station after each such move. For example, in various embodiments, the mobile base station may be configured to perform UE-based positioning methods, whereby the mobile base station periodically wakes up and positions itself (e.g., using a GPS receiver, OTDOA-based positioning, UT-DOA positioning, etc.). This may be especially feasible in deployments where the mobile base station needs to perform such functions for other purposes (e.g., for Integrated Access Backhaul (IAB)). In various embodiments, configuration signaling may be enabled to allow such mobile base stations to identify themselves to network blocks (e.g., an e-SMLC), via RRC signaling/SIBs to a UE that computes its own position rather than simply reporting an RSTD to a network that computes the UE position, etc. However, if the mobile base station can detect that it has been repositioned sufficiently fast, special identification may be unnecessary, as the mobile base station may simply perform a SIB/RRC update with a new latitude-longitude as needed. Furthermore, in context with the above-mentioned enhancement where a network node may transmit a per-beam AoD, ZoD, beamwidth, etc., the ability of the mobile base station to transmit these beam parameters may depend on the ability of the mobile base station to detect orientation changes along with position changes. For example, the mobile base station may include a compass, gyroscope, accelerometer, and/or other suitable sensors that allow the mobile base station to determine a change in orientation along with a change in position. Alternatively or additionally, the mobile base station may have the ability to perform UE functions usable to estimate orientation changes based on the strongest beams received at the mobile base station. In such cases, where the mobile base station can reliably detect orientation changes and position changes, the mobile base station may be configured to transmit one or more beam parameters such as AoD, ZoD, etc. to aid in positioning methods based on reference signals transmitted in such beams.

According to various aspects, still another enhanced positioning method suitable for use in beamformed communication systems may be applicable to drones (e.g., an unmanned aerial vehicle (UAV) or unmanned aerial system (UAS)). In particular, there is currently a push to enable drones to operate on commercial wireless networks and networks of the future, including 5G. The goal is to enable future drone operations, such as Beyond Visual Line of Sight (BVLOS), as regulations evolve to permit them. The ability to fly beyond an operator's visual range could enable successful delivery, remote inspection, and exploration, among other things. Wireless technology can bring many advantages to drones such as ubiquitous coverage, high speed mobile support, robust security, high reliability, and quality of service (QoS). However, drones may operate at different radio conditions than devices on the ground, as interference conditions at higher altitudes differ from interference conditions on the ground. For example, signal strengths may be substantially stronger in the air relative to signal strengths on the ground due to free space propagation conditions that exist in the air. Furthermore, handover performance may be substantially superior in the air due to increased stability of signals with free space propagation relative to signals that are subjected to reflection, multipath propagation, shadowing, and clutter experienced on the ground.

In context with beamforming, drones that are in-flight may see several cells due to line-of-sight and/or free space propagation. Furthermore, in many cases, a terrestrial base station may include one or more antennas arranged to steer or otherwise transmit one or more beams that are tilted in a downward direction to better serve UEs located on the ground. As a result, the downward tilted antenna beam(s) may have a 'backlobe' that points in an upward direction, which could potentially be detected by one or more in-flight drones. In LTE networks, the backlobe may have a sufficient strength to serve the in-flight drone. However, in mmW communication systems, the backlobe may not be strong enough to serve the in-flight drone due to the severe propagation path loss that occurs in mmW communication systems. Accordingly, in various embodiments, one or more base stations may be configured to intentionally point one or more beams in an upward direction to better serve drones in the air. Furthermore, because positioning accuracy is substantially improved in LOS scenarios as opposed to NLOS scenarios as discussed in further detail above, one or more drones may be configured to determine when a LOS scenario exists to reduce timing uncertainties due to reflected paths. For example, when one or more beams reflect off a surface before arriving at a receiver, the reflected beams may appear stronger than other beams even though the reflected beams are NLOS beams. If the receiver assumes that such NLOS beams are LOS beams due to the signal strength associated therewith, this could lead to error or uncertainty in a position estimate that is based on that (incorrect) assumption. However, when a drone is in the air, there are fewer surfaces that can reflect a beam, in which LOS-based positioning methods can be performed more accurately. Furthermore, the likelihood that are no reflective surfaces may be greater at higher altitudes, although those skilled in the art will appreciate that whether any reflective surfaces exist may vary depending on the particular environment in which a drone is operating (e.g., there may be more high-altitude reflective surfaces in a city where there may be very tall skyscrapers, whereas there may be fewer or no high-altitude reflective surfaces in rural areas). While some of the advantages of LOS over NLOS conditions for positioning estimation have been discussed in context of drone UEs, those skilled in the art will readily recognize that this applies to all UEs, with drone UEs only being a specific example where the probability of LOS conditions may be a function of the drone UE altitude.

Accordingly, in various embodiments, a base station (e.g., a gNB) may be configured to request that a UE report channel/UE conditions to assist with positioning functions. For example, in addition to reporting RSRP measurements, a drone UE may be asked to report an estimated power-delay profile as well as UE-based sensor data (e.g., altitude information from a barometer reading). As noted above, if the drone is high enough, the likelihood of reflections from tall buildings, trees, or other surfaces may be reduced. The base station may therefore request that the drone UE report channel/UE conditions to determine with more confidence whether the drone is (or is likely to be) in a LOS scenario. Furthermore, a UE may report estimates of battery life and power consumed in different positioning schemes, which may help the base station to configure the periodicity of downlink reference signals used for positioning (or SRS for UT-DOA), especially with respect to unicast reference signals that are transmitted on demand. In particular, if a drone UE has a low battery, the base station may transmit the downlink reference signals less frequently so that the drone UE does not have to consume power listening for such signals or schedule SRS less frequently so that the drone UE does not have to consume power transmitting the SRS.

According to various aspects, still another enhanced positioning method may be applicable to deployment scenarios that involve a Remote Radio Head (RRH), which refers to a remote base station connected to a serving base station, and/or Distributed Antenna System (DAS), which refers to a network of spatially separated antennas connected to a common source via a transport medium. In such cases, because each RRH/DAS is associated with the same base station, the cell identifier may be the same, but the PRS sequence may be different because each RRH/DAS is deployed in a different location. The different PRS sequences may be associated with the respective RRH/DAS locations, which may help to improve the accuracy of a position fix. In mmW communication systems, each RRH/DAS may also be associated with a Synchronization Signal Block (SSB), which is transmitted according to a beam sweeping pattern because transmitting the SSB omnidirectionally would not have enough beamforming gain. As such, because the SSB and PRS are both transmitted via beamformed communications, the PRS may be quasi-colocated with the SSB sent from the same RRH/DAS (i.e., the PRS and the SSB have the same spatial characteristics, in that the same beam is used to transmit both signals). Furthermore, in various embodiments, the SSB may be frequency division multiplexed with the PRS on at least some occasions. In particular, the SSB may need to be sent more often than the PRS (e.g., every 20 milliseconds) so that a UE does not have to wait a substantial time to pick up the SSB after waking up or otherwise attempting to access the communication system. However, for positioning purposes, there may not be a need to transmit the SSB as often as needed for enabling a UE to access the communication system, whereby a subset of the SSBs may be frequency division multiplexed with the PRS. For example, each SSB may have four (4) OFDM symbols, which may also be sufficient for PRS, in which case the same beamforming may be used to transmit the PRS and the SSB (i.e., the PRS and the SSB may share the same analog beamforming, with the frequency division multiplexing done in the digital domain). However, if the PRS requires more than four OFDM symbols, the PRS may not fit into the time duration of the existing SSB. In such cases, the PRS may be frequency division multiplexed with the SSB for the four OFDM symbols and further SSB repetition may be performed for the additional OFDM symbol(s). For example, in mmW communication systems, each RRH/DAS may be allowed up to sixty-four (64) SSBs, although the network is free to indicate that 64 different beams are being used even though some of the beams may be the same. As such, in various embodiments, the RRH/DAS may configure a subset of the 64 allowed SSBs to be identical and indicate to the UE that the PRS will be frequency division multiplexed with the SSB in such beams, which may help SSB-related measurements as well (e.g., the UE may combine the PRS and/or SSB from multiple beams that are configured to carry such signals).

Figure 8:
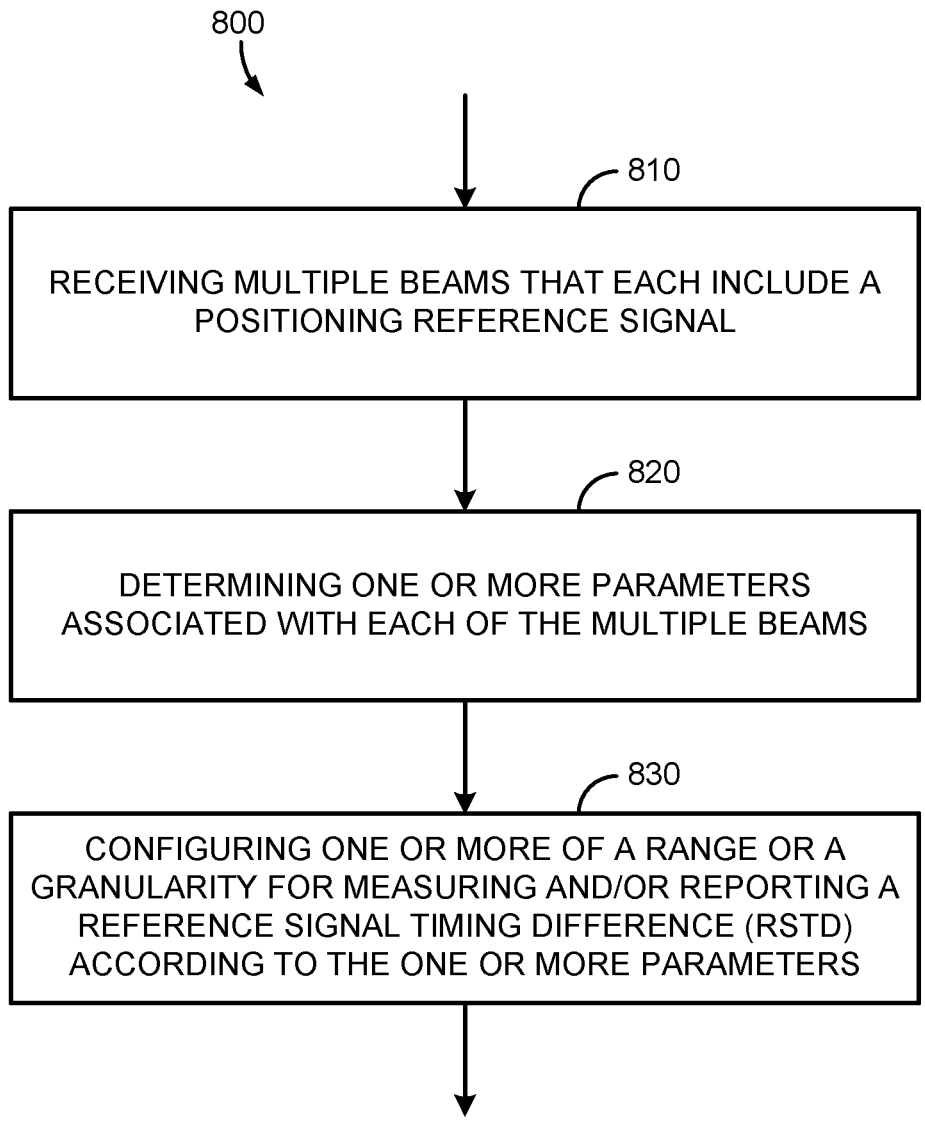
FIG. 8 illustrates a flowchart of an exemplary method performed by a UE for positioning in beamformed communications.

FIG. 8 illustrates an exemplary method 800 performed by a UE, such as the UE 350, 750, for positioning in beamformed communications. At block 810, the UE may receive multiple beams, such as beams 712, 714, 716, from multiple network nodes such as network nodes 710-1, 710-2, 710-3 (e.g., base stations). In an aspect, means to perform block 810 may include one or more of the receivers 354a, the RX processor 356, and/or the controller/processor 359 of the UE 350 illustrated in FIG. 3.

At block 820, the UE may determine one or more parameters associated with each of the multiple beams. In an aspect, means to perform block 820 may include one or more of the RX processor 356 and/or the controller/processor 359 of the UE 350 illustrated in FIG. 3. The determined one or more parameters may include at least one beam-specific parameter and at least one common parameter that is shared across two or more of the multiple beams. The determined one or more parameters may include a repetition factor, a beam shape, a frequency band, a subcarrier spacing numerology, a cyclic prefix, or any combination thereof.

At block 830, the UE may configure one or more of a range or a granularity for measuring and/or reporting a reference signal timing difference (RSTD) according to the one or more parameters. In an aspect, means to perform block 830 may include one or more of the RX processor 356 and/or the controller/processor 359 of the UE 350 illustrated in FIG. 3. The range or the granularity for reporting the RSTD may be used for each of the multiple beams. Also, the range or the granularity for reporting the RSTD may be a function of the at least one beam-specific parameter and the at least one common parameter.

In an aspect, the memory 360 may be an example of a computer-readable medium that stores computer executable instructions for one or more of the TX processor 368, the controller/processor 358, and/or the RX processor 356 of the UE 350 to perform the method 800.

Figure 9:
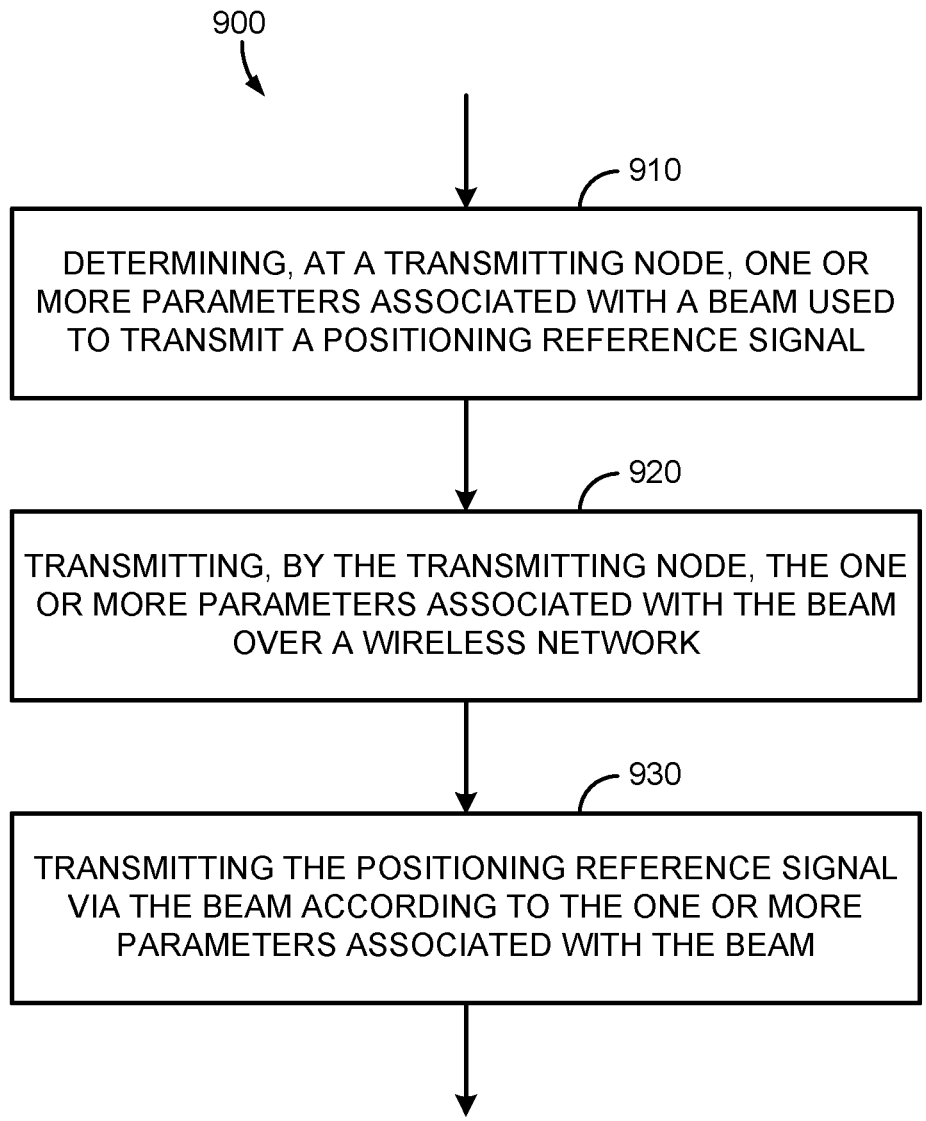
FIG. 9 illustrates a flowchart of an exemplary method performed by a network node such as a base station for positioning in beamformed communications.

FIG. 9 illustrates an exemplary method 900 performed by a network node, such as the network node 310, 710, for positioning in beamformed communications. At block 910, the network node may determine one or more parameters associated with a beam used to transmit a positioning reference signal. In an aspect, means to perform block 910 may include one or more of the controller/processor 375 and/or the TX processor 316 of the network node 310 illustrated in FIG. 3. The one or more parameters include an angle of departure (AoD), a zenith of departure (ZoD), a beamwidth, or any combination thereof. Also, the one or more parameters may be transmitted to a UE, such as the UE 350, 750, in a system information block (SIB). Alternatively or in addition thereto, the one or more parameters may be transmitted to a network entity (e.g., location server) using one or more upper layer interfaces.

At block 920, the network node may transmit the one or more parameters associated with each of the multiple beams over a wireless network. In an aspect, means to perform block 920 may include one or more of the controller/processor 375 and/or the TX processor 316 of the network node 310 illustrated in FIG. 3.

At block 930, the network node may transmit the positioning reference signal via the beam according to the one or more parameters associated with the beam. In an aspect, means to perform block 930 may include one or more of the controller/processor 375 and/or the TX processor 316 of the network node 310 illustrated in FIG. 3.

In an aspect, the memory 376 may be an example of a computer-readable medium that stores computer executable instructions for one or more of the TX processor 316, the controller/processor 375, and/or the RX processor 370 of the network node 310 to perform the method 900.

Figure 10:
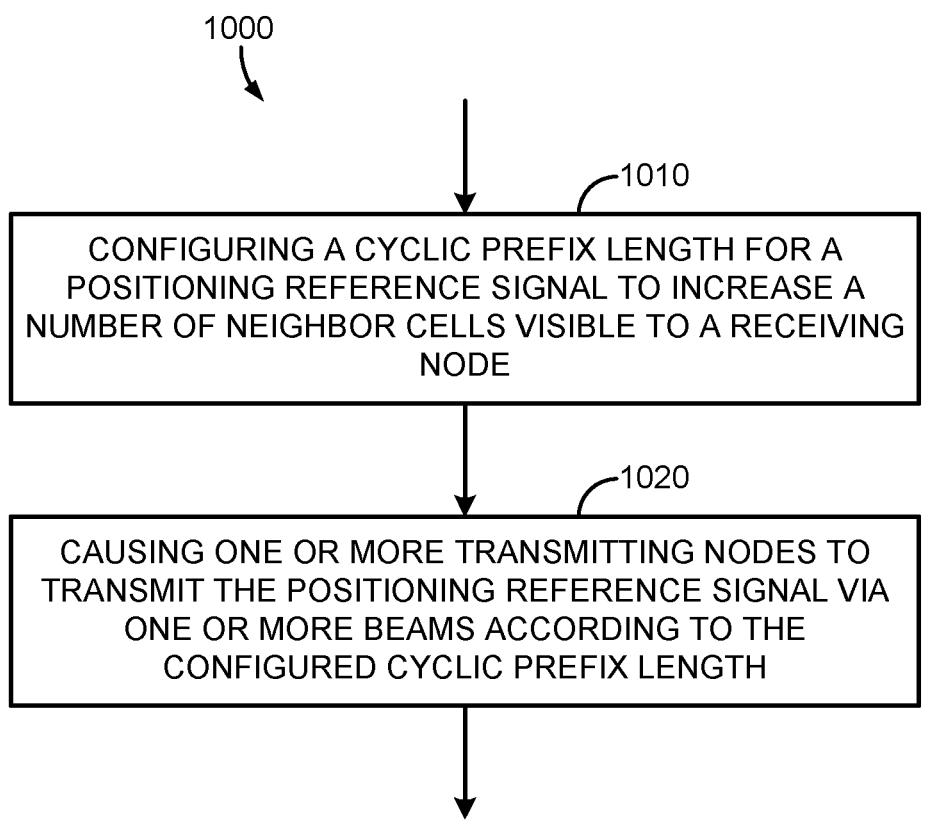
FIG. 10 illustrates a flowchart of an exemplary method performed by a network node such as a base station for positioning in beamformed communications.

FIG. 10 illustrates an exemplary method 1000 performed by a network node, such as the network node 310, 710, for positioning in beamformed communications. At block 1010, the netewok may configure a cyclic prefix length for a positioning reference signal to increase a number of neighbor cells visible to a receiving node such as the UE. In an aspect, means to perform block 1010 may include one or more of the controller/processor 375 and/or the TX processor 316 of the network node 310 illustrated in FIG. 3.

At block 1020, the network node may cause one or more transmitting nodes to transmit the positioning reference signal via one or more beams according to the configured cyclic prefix length. In an aspect, means to perform block 1020 may include one or more of the controller/processor 375 and/or the TX processor 316 of the network node 310 illustrated in FIG. 3.

In an aspect, the memory 376 may be an example of a computer-readable medium that stores computer executable instructions for one or more of the TX processor 316, the controller/processor 375, and/or the RX processor 370 of the network node 310 to perform the method 1000.

Figure 11:
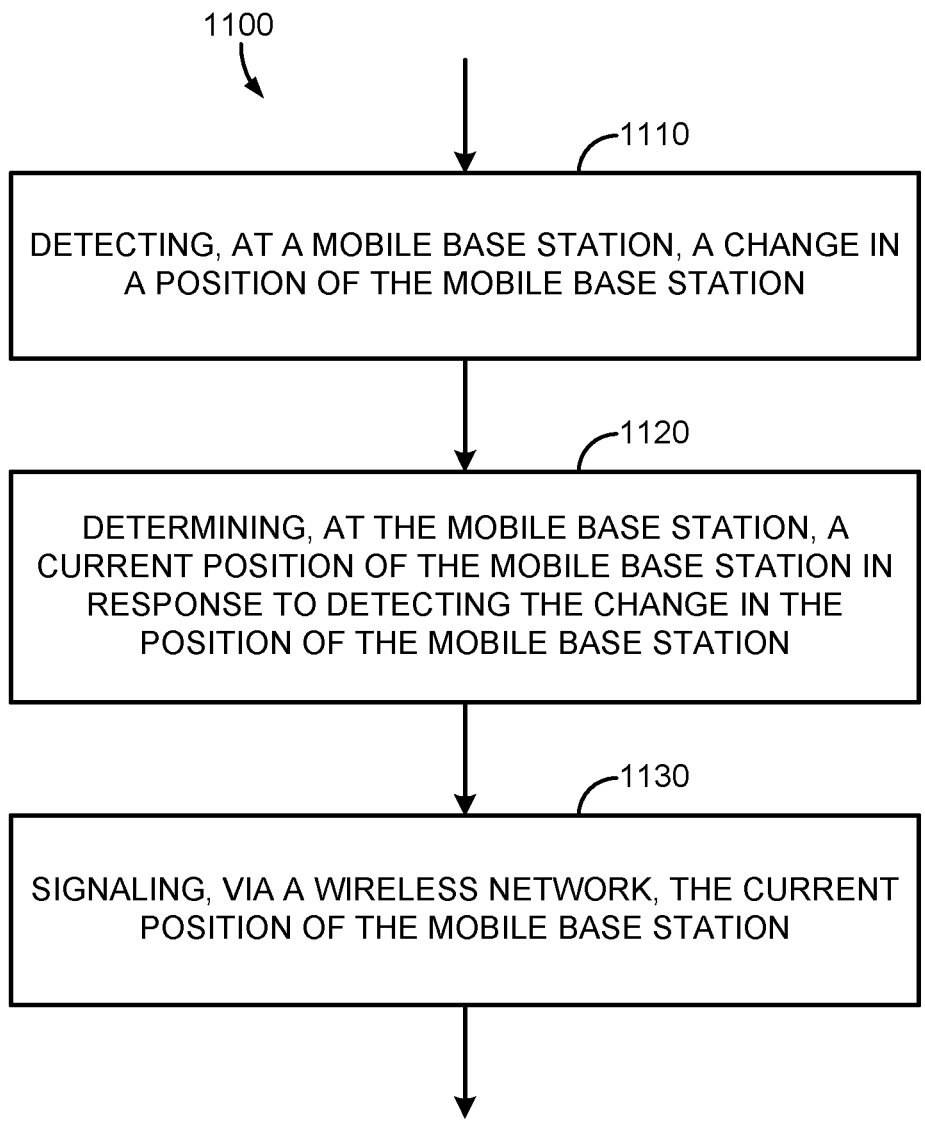
FIG. 11 illustrates a flow chart of an exemplary method performed by a network node, such as a mobile base station, for positioning in beamformed communications.

FIG. 11 illustrates an exemplary method 1100 performed by a network node, such as the network node 310, 710, for positioning in beamformed communications. In particular, the method 1100 may be performed by a mobile base station. At block 1110, the mobile base station may detect a change in a position of the mobile base station. In an aspect, means to perform block 1100 may include the controller/processor 375 of the mobile base station 310 illustrated in FIG. 3. The change in the position of the mobile base station comprises a change in latitude-longitude, a change in orientation, or both.

At block 1120, the mobile base station may determine a current position of the mobile base station in response to detecting the change in the position of the mobile base station. In an aspect, means to perform block 1120 may include one or more of the controller/processor 375 of the mobile base station 310 illustrated in FIG. 3.

At block 1130, the mobile base station may signal, via a wireless network, the current position of the mobile base station. In an aspect, means to perform block 1130 may include one or more of the controller/processor 375 and/or the TX processor 316 of the network node 310 illustrated in FIG. 3.

In an aspect, the memory 376 may be an example of a computer-readable medium that stores computer executable instructions for one or more of the TX processor 316, the controller/processor 375, and/or the RX processor 370 of the network node 310 to perform the method 1100.

Figure 12:
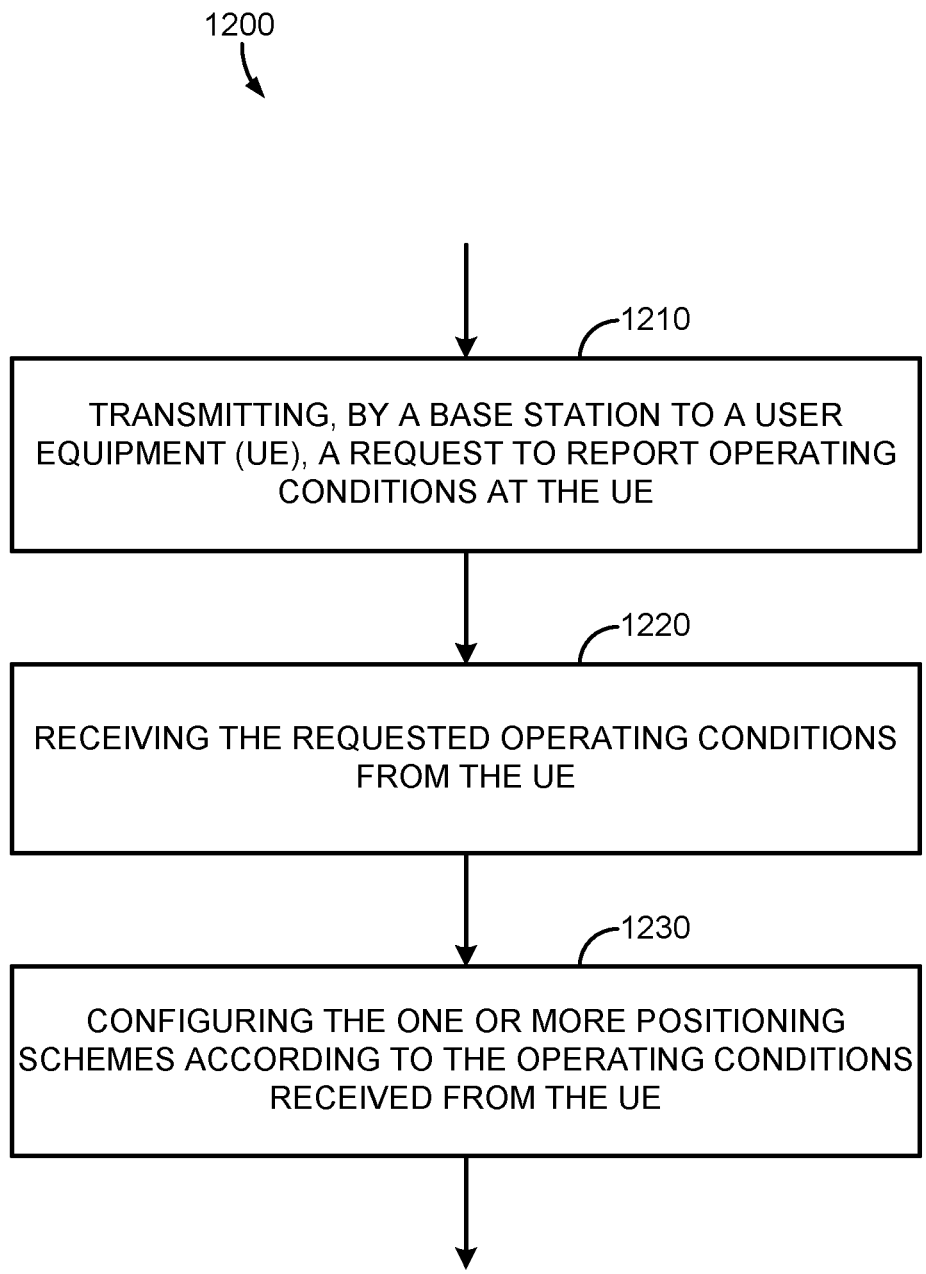
FIG. 12 illustrates a flow chart of an exemplary method performed by a network node, such as a base station, for positioning in beamformed communications.

FIG. 12 illustrates an exemplary method 1200 performed by a network node, such as the network node 310, 710, for positioning in beamformed communications. In particular, the method 1200 may be performed by a base station. At block 1210, the base station may transmit to a UE a request to report operating conditions at the UE. In an aspect, means to perform block 1210 may include one or more of the controller/processor 375 and/or the TX processor 316 of the network node 310 illustrated in FIG. 3. The requested operating conditions may comprise an altitude, available battery life, power consumed in one or more positioning schemes, a power-delay profile of the UE estimated based on a configured reference signal, or any combination thereof.

At block 1220, the base station may receive the requested operating conditions from the UE. In an aspect, means to perform block 1220 may include one or more of the controller/processor 375 and/or the RX processor 370 of the network node 310 illustrated in FIG. 3.

At block 1230, the base station may configure the one or more positioning schemes according to the operating conditions received from the UE. In an aspect, means to perform block 1230 may include one or more of the controller/processor 375 and/or the TX processor 316 of the network node 310 illustrated in FIG. 3.

In an aspect, the memory 376 may be an example of a computer-readable medium that stores computer executable instructions for one or more of the TX processor 316, the controller/processor 375, and/or the RX processor 370 of the network node 310 to perform the method 1200.

Figure 13:
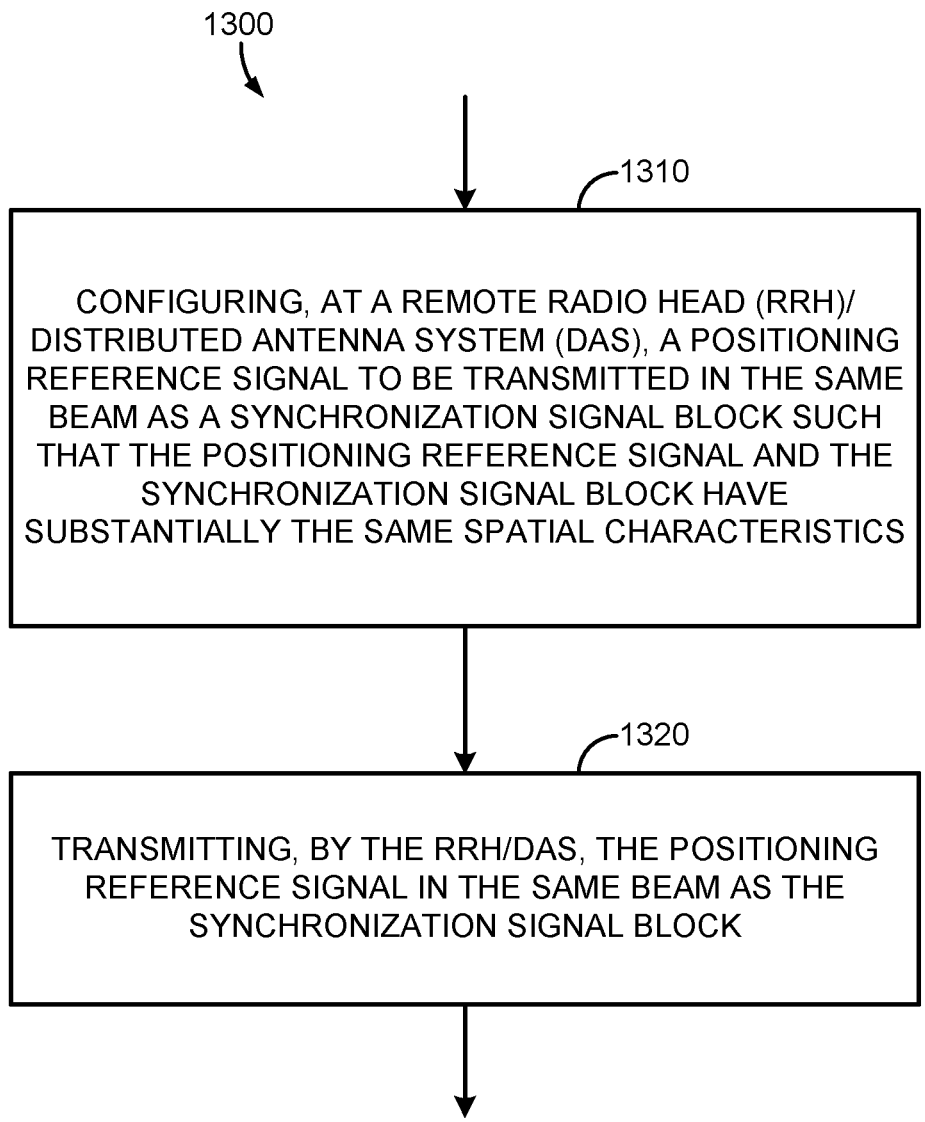
FIG. 13 illustrates a flowchart of an exemplary method performed by a network node such as a Remote Radio Head (RRH) and/or Distributed Antenna System (DAS) for positioning in beamformed communications.

FIG. 13 illustrates an exemplary method 1300 performed by a RRH/DAS, such as the network node 310, 710, for positioning in beamformed communications. At block 1310, the RRH/DAS may configure a positioning reference signal to be transmitted in the same beam as a synchronization signal block such that the positioning reference signal and the synchronization signal block have substantially the same spatial characteristics. In an aspect, means to perform block 1310 may include one or more of the controller/processor 375 and/or the TX processor 316 of the network node 310 illustrated in FIG. 3.

At block 1320, the RRH/DAS may transmit the positioning reference signal in the same beam as the synchronization signal block. In an aspect, means to perform block 1320 may include one or more of the controller/processor 375 and/or the TX processor 316 of the network node 310 illustrated in FIG. 3. Transmitting the positioning reference signal in the same beam as the synchronization signal block may comprise frequency division multiplexing the positioning reference signal with the synchronization signal block in a digital domain.

In an aspect, the memory 376 may be an example of a computer-readable medium that stores computer executable instructions for one or more of the TX processor 316, the controller/processor 375, and/or the RX processor 370 of the network node 310 to perform the method 1300.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for positioning in beamformed communications, comprising:
   receiving multiple beams that each include a positioning reference signal;
   determining one or more parameters associated with each of the multiple beams, wherein the one or more parameters include a frequency band; and
   configuring a granularity for measuring and/or reporting a reference signal timing difference (RSTD) measurement according to the one or more parameters, the granularity defining a step size of the RSTD measurement, and the step size configured according to the frequency band.

2. The method recited in claim 1, wherein the one or more parameters further include a repetition factor, a beam shape, a subcarrier spacing numerology, a cyclic prefix, or any combination thereof.

3. The method recited in claim 1, wherein the one or more parameters include at least one beam-specific parameter and at least one common parameter that is shared across two or more of the multiple beams.

4. The method recited in claim 3, wherein the granularity for reporting the RSTD measurement is a function of the at least one beam-specific parameter and the at least one common parameter.

5. The method recited in claim 1, wherein the granularity for reporting the RSTD measurement is used for each of the multiple beams.

6. An apparatus, comprising:
a receiver configured to receive multiple beams, wherein the multiple beams each include a positioning reference signal; and
at least one processor configured to:
determine one or more parameters associated with each of the multiple beams, wherein the one or more parameters include a frequency band; and
configure a granularity for measuring and/or reporting a reference signal timing difference (RSTD) measurement according to the one or more parameters, the granularity defining a step size of the RSTD measurement, and the step size configured according to the frequency band.

7. The apparatus recited in claim 6, wherein the one or more parameters further include a repetition factor, a beam shape, a subcarrier spacing numerology, a cyclic prefix, or any combination thereof.

8. The apparatus recited in claim 6, wherein the one or more parameters include at least one beam-specific parameter and at least one common parameter that is shared across two or more of the multiple beams.

9. The apparatus recited in claim 8, wherein the granularity for reporting the RSTD measurement is a function of the at least one beam-specific parameter and the at least one common parameter.

10. The apparatus recited in claim 6, wherein the granularity for reporting the RSTD measurement is used for each of the multiple beams.

11. An apparatus, comprising:
means for receiving multiple beams, wherein the multiple beams each include a positioning reference signal;
means for determining one or more parameters associated with each of the multiple beams, wherein the one or more parameters include a frequency band; and
means for configuring a granularity for measuring and/or reporting a reference signal timing difference (RSTD) measurement according to the one or more parameters, the granularity defining a step size of the RSTD measurement, and the step size configured according to the frequency band.

12. The apparatus recited in claim 11, wherein the one or more parameters further include a repetition factor, a beam shape, a subcarrier spacing numerology, a cyclic prefix, or any combination thereof.

13. The apparatus recited in claim 11, wherein the one or more parameters include at least one beam-specific parameter and at least one common parameter that is shared across two or more of the multiple beams.

14. The apparatus recited in claim 13, wherein the granularity for reporting the RSTD measurement is a function of the at least one beam-specific parameter and the at least one common parameter.

15. The apparatus recited in claim 11, wherein the granularity for reporting the RSTD measurement is used for each of the multiple beams.

16. A non-transitory computer-readable medium having one or more computer-executable instructions for a processor of an apparatus stored thereon, the instructions comprising:
one or more instructions causing the processor to receive multiple beams that each include a positioning reference signal;
one or more instructions causing the processor to determine one or more parameters associated with each of the multiple beams, wherein the one or more parameters include a frequency band; and
one or more instructions causing the processor to configure a granularity for measuring and/or reporting a reference signal timing difference (RSTD) measurement according to the one or more parameters, the granularity defining a step size of the RSTD measurement, and the step size configured according to the frequency band.

17. The computer-readable medium recited in claim 16, wherein the one or more parameters further include a repetition factor, a beam shape, a subcarrier spacing numerology, a cyclic prefix, or any combination thereof.

18. The computer-readable medium recited in claim 16, wherein the one or more parameters include at least one beam-specific parameter and at least one common parameter that is shared across two or more of the multiple beams.

19. The computer-readable medium recited in claim 18, wherein the granularity for reporting the RSTD measurement is a function of the at least one beam-specific parameter and the at least one common parameter.

20. The computer-readable medium recited in claim 16, wherein the granularity for reporting the RSTD measurement is used for each of the multiple beams.

21. A method for positioning in beamformed communications, comprising:
determining, at a transmitting node, one or more parameters associated with a beam used to transmit a positioning reference signal;
transmitting, by the transmitting node, the one or more parameters associated with the beam over a wireless network; and
transmitting the positioning reference signal via the beam according to the one or more parameters associated with the beam,
wherein the one or more parameters are transmitted in one or more system information blocks (SIBs).

22. The method recited in claim 21, wherein the one or more parameters include an angle of departure (AoD), a zenith of departure (ZoD), a beamwidth, or any combination thereof.

23. A method for positioning in beamformed communications, comprising:
detecting, at a mobile base station, a change in a position of the mobile base station, the change in the position including a change in an orientation of the mobile base station, the orientation related to an angle of departure (AoD) of a transmission beam of the mobile base station;

determining, at the mobile base station, a current position of the mobile base station in response to detecting the change in the position of the mobile base station; and signaling, via a wireless network, the current position of the mobile base station.

24. The method recited in claim 23, wherein the change in the position of the mobile base station comprises a change in latitude-longitude.

\* \* \* \* \*